(12) United States Patent
Santos et al.

(10) Patent No.: US 7,363,288 B2
(45) Date of Patent: Apr. 22, 2008

(54) METHOD OF CHECKPOINTING AND RESTARTING PROCESSES WHICH SHARE OPEN FILE

(75) Inventors: Jose Renato Santos, San Jose, CA (US); Dinesh Kumar Subhraveti, Los Angeles, CA (US); Yoshio Frank Turner, Redwood City, CA (US); Gopalakrishnan Janakiraman, Sunnyvale, CA (US); David E. Lowell, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 513 days.

(21) Appl. No.: 10/837,410

(22) Filed: Apr. 30, 2004

(65) Prior Publication Data

US 2005/0256843 A1 Nov. 17, 2005

(51) Int. Cl.
*G06F 17/30* (2006.01)
(52) U.S. Cl. .............................. 707/2; 707/202; 707/1; 718/103
(58) Field of Classification Search ...................... None
See application file for complete search history.

(56) References Cited

U.S. PATENT DOCUMENTS 6,338,147 B1 1/2002 Meth et al.
2002/0087916 A1* 7/2002 Meth ........................... 714/16
2005/0050099 A1* 3/2005 Bleistein et al. ......... 707/104.1

OTHER PUBLICATIONS

Bouteiller, A., et al., Coordinated checkpoint versus message log for fault tolerant MPI, Dec. 2003.
Duell, J., The Design and Implementation of Berkeley Lab's Linux Checkpoint/Restart, 2003.
Litzkow, M., et al., Checkpoint and Migration of UNIX Processes in the Condor Distributed Processing System, 1997.
Osman, S., et al., The Design and Implementation of Zap: A System for Migrating Computing Environments, Proc. OSDI 2002, Dec. 2002.
Plank, J.S., et al., Libckpt: Transparent Checkpointing under Unix, <http://www.cs.utk.edu/plank/plank/papers/USENIX-95W.html>, 1995.
Plank, J.S., An Overview of Checkpointinng in Uniprocessor and Distributed Systems, Focusing on Implementation and Performance, Tech. Report UT-CS-97-372, Univ. of Tenn., Knoxville, Tenn., Jul. 1997.
Stellner, G., CoCheck: Checkpointing and Process Migration for MPI, 1996.
Youhui, Z., et al., Checkpointing and Migration of parallel processes based on Message Passing Interface, Oct. 2002.
Zhong, H., et al., CRAK: Linux Checkpoint/Restart As a Kernel Module, Technical Report CUCS-014-01, <http://www.ncl.cs.columbia/research/migrate/crak.html>, Nov. 2001.

* cited by examiner

*Primary Examiner*—Christian Chace
*Assistant Examiner*—Tomasz Ponikiewski

(57) ABSTRACT

A method of checkpointing and restarting processes that share a file that is open begins with a step of assigning a priority to one of the processes that share the file. This identifies a priority process. The method concludes with a step of reopening the file when restoring the priority process.

16 Claims, 2 Drawing Sheets

METHOD OF CHECKPOINTING AND RESTARTING PROCESSES WHICH SHARE OPEN FILE

RELATED APPLICATIONS

This application is related to U.S. application Ser. Nos. 10/836,538; 10/837,110; 10/836,957; and 10/837,420, filed on Apr. 30, 2004, the contents of which are hereby incorporated by reference.

FIELD OF THE INVENTION

The present invention relates to the field of computer processes. More particularly, the present invention relates to the field of computer processes where the processes are checkpointed and later restarted.

BACKGROUND OF THE INVENTION

A computer in operation includes hardware, software, and data. The hardware typically includes a processor, memory, storage, and I/O (input/output) devices coupled together by a bus. The software typically includes an operating system and applications. The applications perform useful work on the data for a user or users. The operating system provides an interface between the applications and the hardware. The operating system performs two primary functions. First, it allocates resources to the applications. The resources include hardware resources—such as processor time, memory space, and I/O devices—and software resources including some software resources that enable the hardware resources to perform tasks. Second, it controls execution of the applications to ensure proper operation of the computer.

Often, the software is conceptually divided into a user level, where the applications reside and which the users access, and a kernel level, where the operating system resides and which is accessed by system calls. Within an operating computer, a unit of work is referred to as a process. A process is computer code and data in execution. The process may be actually executing or it may be ready to execute or it may be waiting for an event to occur. The system calls provide an interface between the processes and the operating system.

Checkpointing is a technique employed on some computers where processes take significant time to execute. By occasionally performing a checkpoint of processes and resources assigned to processes, the processes can be restarted at an intermediate computational state in an event of a system failure. Migration is a technique in which running processes are checkpointed and then restarted on another computer. Migration allows some processes on a heavily used computer to be moved to a lightly used computer. Checkpointing, restart, and migration have been implemented in a number of ways.

Operating system checkpoint, restart, and migration has been implemented as an integral part of several research operating systems. However, such research operating systems are undesirable because they lack an installed base and, consequently, few applications exist for them. Application level checkpoint, restart, and migration in conjunction with standard operating systems has also been implemented. But these techniques require that processes not use some common operating system services because the checkpointing only takes place at the application level.

Object based checkpoint, restart, and migration have also been implemented. Such object based approaches use particular programming languages or middleware toolkits. The object based approaches require that the applications be written in one of the particular programming languages or that the applications make explicit use of the middleware toolkits. A virtual machine monitor approach can be used to implement checkpoint, restart, and migration. But such an approach requires checkpointing and restarting all processes within the virtual machine monitor. This approach also exhibits poor performance due to isolation of the virtual machine monitor from an underlying operating system.

In *The Design and Implementation of Zap: A System for Migrating Computing Environments*, Proc. OSDI 2002, Osman et al. teach a technique of adding a loadable kernel module to a standard operating system to provide checkpoint, restart, and migration of processes implemented by existing applications. The loadable kernel model divides the application level into process domains and provides virtualization of resources within each process domain. Such virtualization of resources includes virtual process identifiers and virtualized network addresses. Processes within one process domain are prevented from interacting with processes in another process domain using inter-process communication techniques. Instead, processes within different process domains interact using network communications and shared files set up for communication between different computers.

Checkpointing in the technique taught by Osman et al. records the processes in a process domain as well as the state of the resources used by the processes. Because resources in the process domain are virtualized, restart or migration of a process domain includes restoring resource identifications to a virtualized identity that the resources had at the most recent checkpoint.

While the checkpoint, restart, and migration techniques taught by Osman et al. show promise, several areas could be improved. In particular, a checkpoint and later restart must support open files shared by multiple processes. If two processes share an open file when the processes are checkpointed, the open file should also be shared upon restarting the processes from the checkpoint. If the file is opened independently by both processes, the application that created the processes could fail.

What is needed is a method of checkpointing and restarting processes which share an open file.

SUMMARY OF THE INVENTION

The present invention is a method of checkpointing and restarting processes that share a file that is open. The method begins with a step of assigning a priority to one of the processes that share the file. This identifies a priority process. The method concludes with a step of reopening the file when restoring the priority process.

These and other aspects of the present invention are described in more detail herein.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT

The present invention comprises a method of checkpointing and restarting processes in which at least two of the processes share an open file. According to an embodiment, the method begins during a checkpoint operation with a first step of assigning a priority to one of the processes that share a file that is open. This identifies a priority process. According to another embodiment, the first step of assigning the priority takes place during a restart operation. The method concludes with a second step of reopening the file when restoring the priority process during the restart operation.

Figure 1:
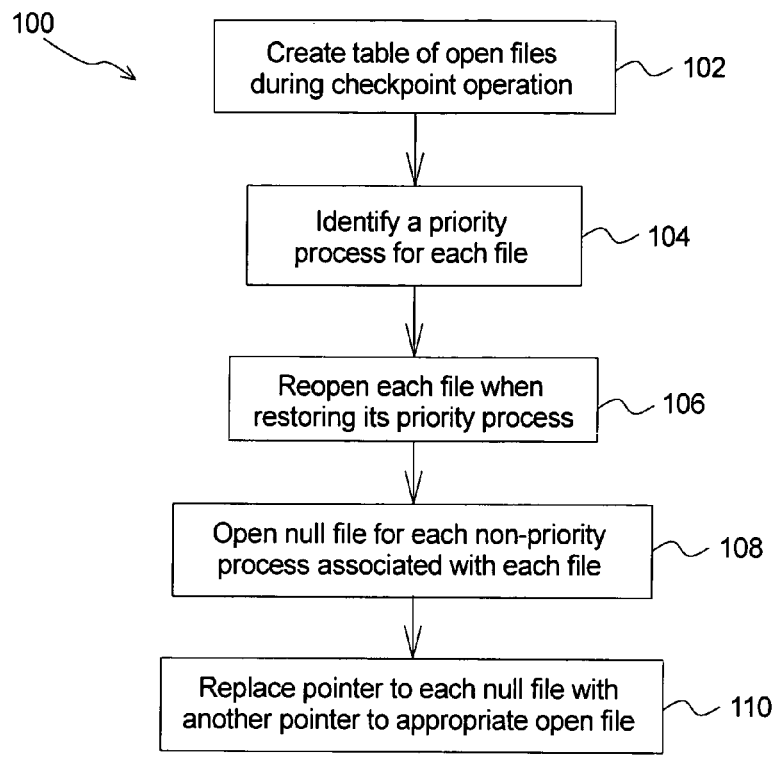
FIG. 1 illustrates an embodiment of a method of checkpointing and restarting processes that share an open file of the present invention as a flow chart.

An embodiment of a method of checkpointing and restarting processes in which at least two of the processes share an open file is illustrated in FIG. 1 as a flow chart. The method 100 begins during a checkpoint operation of the processes. The checkpoint operation takes place on a computer system upon which the processes are operating. The method 100 ends during a restart operation of the processes. According to an embodiment, the restart operation takes place on the computer system upon which the checkpoint operation took place. According to another embodiment, the restart operation takes place on another computer system.

Figure 2:
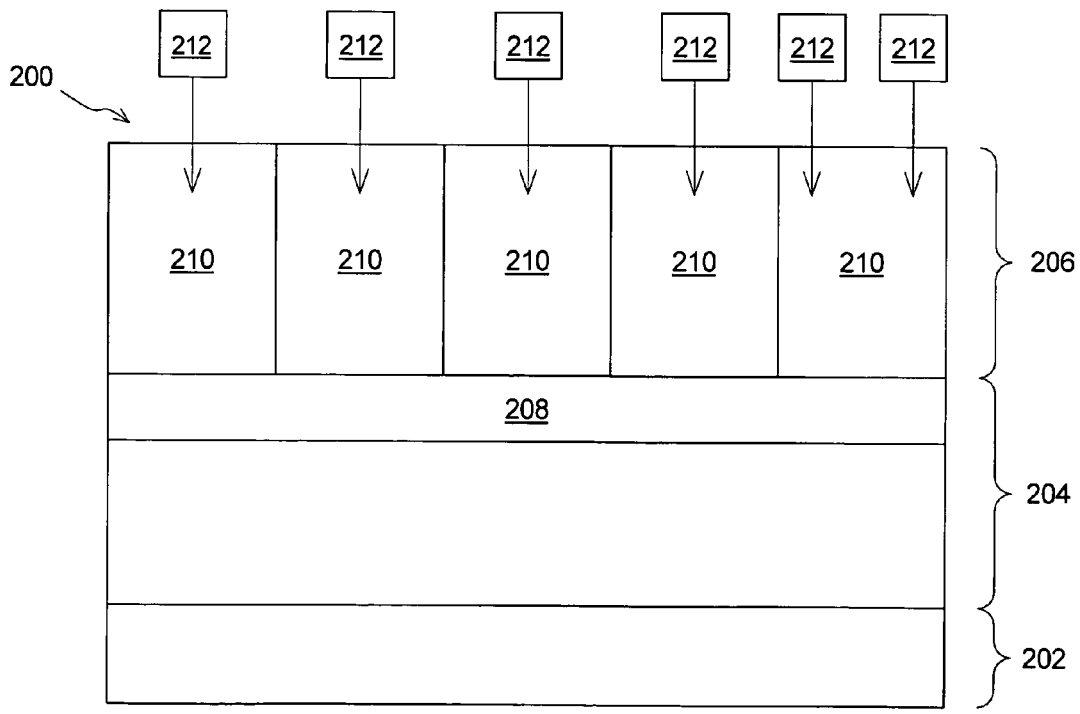
FIG. 2 schematically illustrates a computer system which implements a checkpoint operation as part of a method of checkpointing and restarting processes that share an open file of the present invention.

A computer system which implements the method of checkpointing and restarting the processes is illustrated schematically in FIG. 2. The computer system 200 comprises computer hardware 202, an operating system kernel 204, and a user level 206. The operating system kernel 204 includes a process domain module 208, which divides the user level 206 into a plurality of process domains 210. As users 212 access and leave the computer systems 200, the process domain module 208 creates and terminates process domains 210 as needed.

According to an embodiment, the method 100 (FIG. 1) comprises a portion of a checkpointing and restarting method for processes within one of the process domains 210. According to another embodiment, the method 100 comprises a portion of another checkpointing and restarting method.

The method 100 begins with a first step 102 of creating a checkpoint open files table during a checkpoint operation. The checkpoint open files table comprises entries for the open files accessed by the processes. Each entry comprises an open file state and one or more process-file descriptor pairs. The open file state identifies an open file and includes open file information for the open file. The open file information includes such information as a next byte to be read or written from the open file, access control information such as whether the open file is read only or whether there is permission for reads and writes, and an indication of whether the open file is to be deleted upon closing it. Each of the process-file descriptor pairs identifies a virtual process identifier and a file descriptor.

The virtual process identifier identifies a process at the user level 206 which accesses the open file. The virtual process identifier at the user level 206 maps to a process identifier at the kernel level 204. The file descriptor comprises an entry in a per-process open files table which points to the open file structure in a system-wide open files table.

In normal execution, a process opens a file using an open system call. The open system call returns a file descriptor to the process and creates an entry in the per-process open files table associated with the process. The entry in the per-process open files table includes the file descriptor. When the process later accesses the open file (e.g., a read or a write), the process identifies the open file using the file descriptor and the per-process open files table. The file descriptor is unique to the process which created it.

If a particular entry in the checkpoint open files table comprises a single process-file descriptor pair, the open file is not shared. In this situation, the open file is accessed by a single process identified by the virtual process identifier of the process-file descriptor pair. If the particular entry comprises two or more process-file descriptor pairs, the open file is shared by the processes identified by the two or more virtual process identifiers found in the two or more process-file descriptor pairs, respectively.

Figure 3:
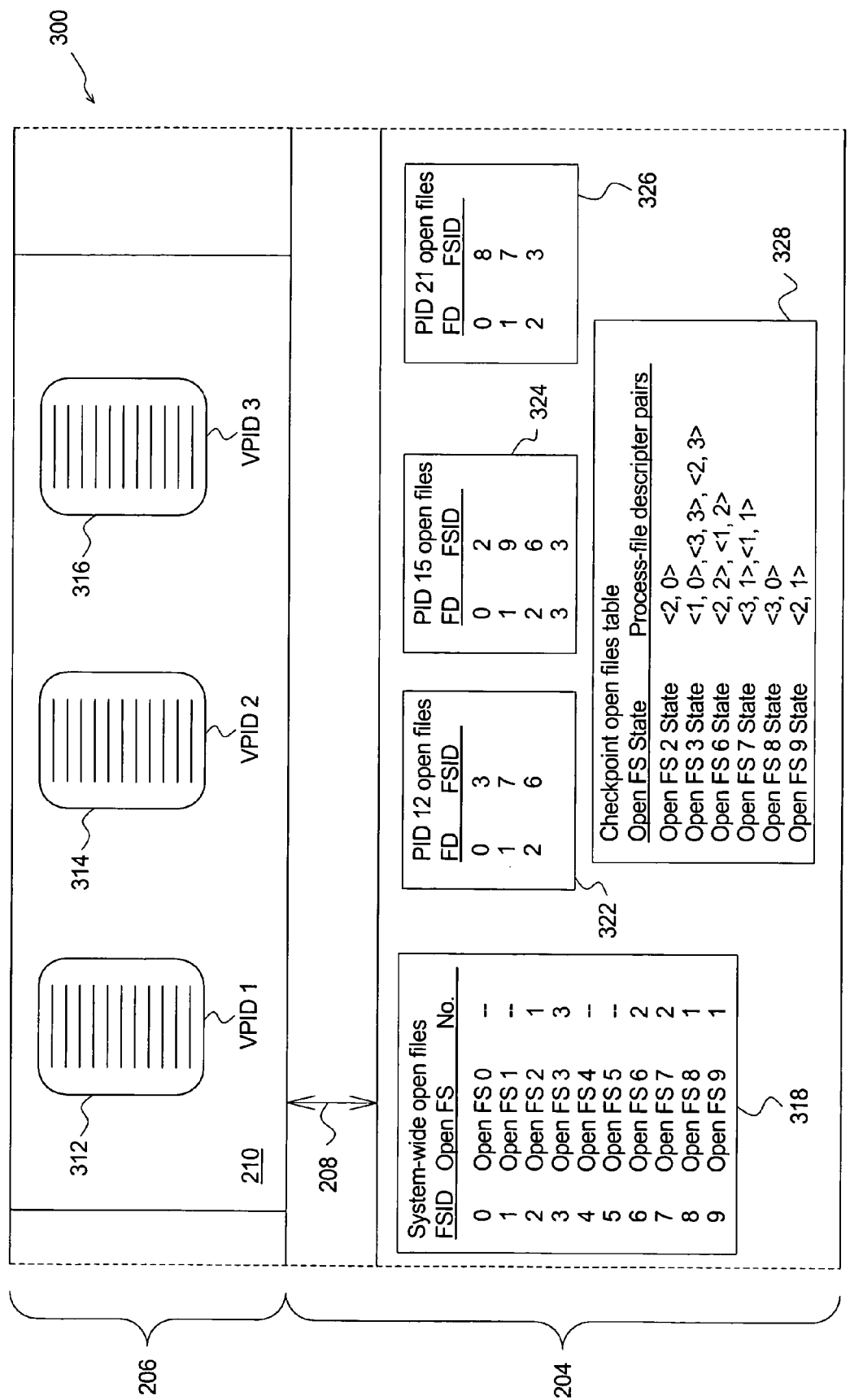
FIG. 3 schematically illustrates a portion of a computer system which implements a checkpoint operation as part of a method of checkpointing and restarting processes that share an open file of the present invention.

An embodiment of a portion of the computer system 200 which implements the checkpoint operation is illustrated schematically in FIG. 3. The portion 300 of the computer system 200 (FIG. 2) comprises the operating system kernel 204 and the user level 206. The operating system kernel 204 includes the process domain module 208, which forms the process domain 210 at the user level 206. Within the process domain 210, first, second, and third processes, 312 . . . 316, execute prior to the checkpoint operation.

According to an embodiment, the process domain module 208 virtualizes process identifiers (PIDs) for the first through third processes, 312 . . . 316, at the user level. According to this embodiment, the first process 312 comprises a VPID (virtual PID) of 1 at the user level 206, the second process 314 comprises a VPID of 2 at the user level 206, and the third process 316 comprises a VPID of 3 at the user level 206. At the kernel level 204, the first through third processes, 312 . . . 316, comprise PIDs that, in general, will differ from the VPIDs at the user level 206. For example, the VPIDs of 1, 2, and 3 might correspond to PIDs of 12, 15, and 21, respectively.

According to another embodiment, the computer system 200 does not include the process domain module 208 and the user level does not include the process domain 210. According to this embodiment, the first through third processes, 312 . . . 316, use their PIDs at the user level 206.

According to an embodiment, the kernel level 204 comprises the system-wide open files table 318 and first through third per-process open files tables, 322 . . . 326, for the first through third processes, 312 . . . 316, respectively.

Upon initiation of the checkpoint operation, each of the first through third processes, 312 . . . 316, suspends normal execution and checkpoints itself. According to an embodiment, the checkpoint operation includes creating the checkpoint open files table 328 at the kernel level 204. According to an embodiment employing the Linux operating system, the checkpoint open files table comprises an open file structure state for each open file structure and for each open file structure state the one or more process-file descriptor pairs. Each open file structure state comprises an open file state.

According to an embodiment employing the Linux operating system, the system-wide open files table 318 comprises the open file structures. The per-process open file tables, 322 . . . 326, for the first through third processes, 312 . . . 316, map file descriptors to file structure numbers in the system-wide open files table 318.

According to an embodiment, the process-file descriptor pairs are indicated by as <VPID number, file descriptor (FD)

number>. For example, a first entry in the checkpoint open files table 328 comprises open FS 2 (open file structure 2) and <VPID 2, FD 0>. A second entry in the checkpoint open files table 328 comprises open FS 3 and <VPID 1, FD 0>, <VPID 3, FD 3>, <VPID 2, FD 3>. And a third entry in the checkpoint open files table 328 comprises open FS 6 and <VPID 2, FD 2>, <VPID 1, FD 2>.

In a second step 104, the method 100 (FIG. 1) assigns a priority to a process-file descriptor pair for each file identifier in the checkpoint open files table 328 (FIG. 3). This identifies a priority process for each open file. According to an embodiment, the second step 104 comprises placing a process-file descriptor pair in a first process-file descriptor pair slot for each open file structure. The process-file descriptor pair in the first process descriptor slot identifies the priority process. Remaining process-file descriptor pairs for a particular open file structure, if any, identify non-priority processes. For example, according to this embodiment, the priority processes for open file structures 3, 6, and 7 of the checkpoint open files table 328 are the virtual PIDs 1, 2, and 3, respectively.

According to an embodiment, identification of the priority process occurs during the checkpoint operation. According to another embodiment, identification of the priority process occurs during the restart operation. An example of the latter embodiment comprises reordering the process-file descriptor pairs for each of the open file structures so that a virtual PID having a lowest number occupies the priority slot.

The method 100 continues during the restart operation in which the priority process for each open file reopens the open file in a third step 106. According to an embodiment in which file descriptors are not issued numerically in an order in which a process makes the open system call, the method 100 concludes with a step of associating each open file with its non-priority processes, if any. According to another embodiment in which the file descriptors are issued numerically in the order in which a process makes the open system call such as with the Linux operating system, each non-priority process opens a null file in lieu of opening the open file during restoration of the non-priority process. In this way, each non-priority process creates file descriptors in the per-process open files table for the non-priority process which correlate to the file descriptors in the checkpoint open files table 328 (FIG. 3). If a particular process is identified as a non-priority process for multiple open files, this results in the particular process opening multiple null files. In a fifth step 110, each non-priority process replaces a file structure identifier for each null file within the per-process open files table for the non-priority process with the file structure identifier for the open file. Of course a particular non-priority process cannot replace the file structure identifier for the null file with the file structure identifier for the open file until the priority process has restored the open file including creating an entry in a system-wide open files table.

It will be readily apparent to one skilled in the art that the checkpoint operation and the restart operation do not, in general, comprise sequential operations on a particular computer. If the checkpoint operation is performed for the purpose of providing an intermediate computational state in an event of failure on the particular computer, many checkpoint operations may occur before a need for the restart operation occurs. If the checkpoint operation is performed as part of a suspend operation that allows a higher priority application to make use of the particular computer, there will be a time gap between the checkpoint operation and the restart operation. If the checkpoint operation is performed as part of a migration of processes from the particular computer to another computer, the checkpoint operation will take place on the particular computer and the restart operation will take place on the other computer.

An alternative embodiment of the method of checkpointing and restarting processes of the present invention also includes recognizing that some open files are marked for deletion. According to this embodiment, the method recognizes that one or more particular files of the open files are marked for deletion in a first step. A second step nullifies a deletion operation for a duration of the checkpoint operation. A third step opens the one or more particular files during the restart operation. A fourth step marks the one or more particular files for deletion as part of the restart operation.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of checkpointing and restarting processes in which at least two of the processes share an open file comprising the steps of:
    creating a checkpoint open files table in a computer-readable medium during a checkpoint operation, the checkpoint open files table comprising entries for open files, each entry comprising an open file state for a file and a process-file descriptor pair for each process that accesses the file, the entry for each open file that is shared comprising at least two process-file descriptor pairs;
    assigning a priority process for each open file state in the checkpoint open files table, any remaining processes for each open file state being processes that share the open file and comprising non-priority processes;
    reopening each file when restoring the priority process for the file during a restart operation; and
    associating each non-priority process to the file reopened by the priority process.

2. The method of claim 1 wherein the open file state comprises information for restoring an open file structure for the file.

3. The method of claim 1 wherein the process-file descriptor pair for each process that accesses the file comprises a process identifier and a file descriptor.

4. The method of claim 1 wherein the process-file descriptor pair for each process that accesses the file comprises a virtual process identifier and a file descriptor.

5. The method of claim 1 said associating comprising the step of opening a null file for each non-priority process associated with each file descriptor when restoring the non-priority processes.

6. The method of claim 5 said associating further comprising the step of replacing a null file identifier to each null file for each non-priority process with a file identifier for the file.

7. The method of claim 1 wherein during the checkpoint operation the files include one or more particular files marked for deletion.

8. The method of claim 7 further comprising the steps of:
    detecting the one or more particular files marked for deletion during the checkpoint operation;
    nullifying a deletion mark for each particular file for a duration of the checkpoint operation;
    opening each particular file as part of a restart operation; and marking each particular file for deletion as part of the restart operation.

9. A computer readable medium having computer readable program code stored thereon, which when executed performs a method of checkpointing and restarting processes in which at least two of the processes share an open file, the method of checkpointing and restarting the processes comprising the steps of:

creating a checkpoint open files table in a computer-readable medium during a checkpoint operation, the checkpoint open files table comprising entries for open files, each entry comprising an open file state for a file and a process-file descriptor pair for each process that accesses the file, the entry for each open file that is shared comprising at least two process-file descriptor pairs;

assigning a priority process for each open file state in the checkpoint open files table, any remaining processes for each open file state being processes that share the open file and comprising non-priority processes;

reopening each file when restoring the priority process for the file during a restart operation; and associating each non-priority process to the file reopened by the priority process.

10. The computer readable media of claim 9 wherein the open file state comprises information for restoring an open file structure for the particular file.

11. The computer readable media of claim 9 wherein the process-file descriptor pair for each process that accesses the file comprises a virtual process identifier and a file descriptor.

12. The computer readable media of claim 9 wherein the process-file descriptor pair for each process that accesses the file comprises a process identifier and a file descriptor.

13. The computer readable media of claim 9 said associating comprising the step of opening a null file for each non-priority process associated with each file descriptor when restoring the non-priority processes.

14. The computer readable media of claim 13 said associating further comprising the step of replacing a null file identifier for each null file for each non-priority process with a file identifier for the file.

15. The computer readable media of claim 9 wherein during the checkpoint operation the files include one or more particular files marked for deletion.

16. The computer readable media of claim 15 further comprising the steps of:

detecting the one or more particular files marked for deletion during the checkpoint operation;

nullifying a deletion mark for each particular file for a duration of the checkpoint operation; opening each particular file as part of a restart operation; and marking each particular file for deletion as part of the restart operation.

* * * * *